US012679485B2

(12) United States Patent <br> Li et al.

(10) Patent No.: US 12,679,485 B2 <br> (45) Date of Patent: Jul. 14, 2026

(54) UNMANNED VEHICLE SUITABLE FOR MOUNTAINS AND HILLS AND ATTITUDE ADJUSTMENT METHOD

(71) Applicant: Zhejiang University, Hangzhou (CN)

(72) Inventors: Xiaoli Li, Hangzhou (CN); Wenkai Zhang, Hangzhou (CN); Xuelun Luo, Hangzhou (CN); Yong He, Hangzhou (CN); Qinghai He, Hangzhou (CN); Yueping Xu, Hangzhou (CN)

(73) Assignee: Zhejiang University, Hangzhou (CN)

( * ) Notice: Subject to any disclaimer, the term of this patent is extended or adjusted under 35 U.S.C. 154(b) by 626 days.

(21) Appl. No.: 18/140,678

(22) Filed: Apr. 28, 2023

(65) Prior Publication Data

US 2024/0174307 A1     May 30, 2024

(30) Foreign Application Priority Data

Nov. 29, 2022    (CN) .......................... 202211510773.5

(51) Int. Cl.
    *B62D 55/116*        (2006.01)
    *B62D 55/065*        (2006.01)
    *B62D 55/112*        (2006.01)

(52) U.S. Cl.
    CPC .......... *B62D 55/116* (2013.01); *B62D 55/065* (2013.01); *B62D 55/112* (2013.01)

(58) Field of Classification Search
    CPC .... B62D 55/116; B62D 55/065; B62D 55/112

USPC .......................................................... 180/9.1 <br> See application file for complete search history.

(56) References Cited

U.S. PATENT DOCUMENTS

2024/0174307 A1 *   5/2024   Li ........................ B62D 55/116

FOREIGN PATENT DOCUMENTS

DE      102004058523 A1 *   6/2006   ........... B60G 17/016
EP           3406125 A2 *   11/2018   ........... B60G 17/016
JP          2016159647 A *   9/2016

* cited by examiner

*Primary Examiner* — John Olszewski <br> *Assistant Examiner* — Nathaniel William Watkins <br> (74) *Attorney, Agent, or Firm* — Reising Ethington P.C.

(57) ABSTRACT

Disclosed is an unmanned vehicle suitable for mountains and hills and an attitude adjustment method, relating to the technical field of intelligent agricultural equipment in mountainous and hilly regions. The unmanned vehicle includes a frame and side arms arranged on both sides of the frame. The lower end of each side arm is provided with a traveling device, and each side arm is provided with an attitude adjustment device. The attitude adjustment devices are respectively connected to both sides of the frame, and the attitude adjustment devices are configured to adjust an attitude of the frame. The frame is provided with a control structure and a triaxial angle sensor, both of which are electrically connected to the control structure, and the triaxial angle sensor is configured to detect an angle of inclination of the frame. The unmanned vehicle can achieve the slope adaptation in the mountainous and hilly areas.

13 Claims, 8 Drawing Sheets

Left

Right

1

UNMANNED VEHICLE SUITABLE FOR MOUNTAINS AND HILLS AND ATTITUDE ADJUSTMENT METHOD

CROSS-REFERENCE TO RELATED APPLICATION

This patent application claims the benefit and priority of Chinese Patent Application No. 202211510773.5, filed with the China National Intellectual Property Administration on Nov. 29, 2022, the disclosure of which is incorporated by reference herein in its entirety as part of the present application.

TECHNICAL FIELD

The present disclosure relates to the technical field of intelligent agricultural equipment in mountainous and hilly regions, and in particular to an unmanned vehicle suitable for mountains and hills and an attitude adjustment method.

BACKGROUND

Information acquisition is one of the most critical links to achieve the construction of smart tea gardens, as well as the growth environmental regulation of tea trees and efficient production. In the face of unstructured environments of tea gardens in mountainous and hilly areas, constructing tea tree information collection equipment with excellent stability and strong terrain self-adaptation to change the status that "the equipment is difficult to climb mountains" and "the equipment on the mountains is difficult to apply" has become an urgent problem to be solved in the construction of smart tea gardens. Building a vehicle-mounted intelligent sensing platform for tea tree information with high stability and strong unstructured terrain self-adaptation to achieve rapid, multidimensional and multi-scale real-time monitoring of plant growth information provides an accurate information support for growth information detection of the tea trees and intelligent management and regulation of water and fertilizer, which is conducive to break through traditional tea tree information acquisition difficulties and low degree of intelligent management of tea gardens and other technical development bottlenecks.

At present, most of application scenarios of field information monitoring platforms are mainly lands for land for growing field crops, with simple environmental structure and flat terrain, which requires low terrain adaptation of the vehicle-mounted information monitoring platform. However, tea trees are mainly planted in mountainous and hilly areas. At present, there is a lack of self-propelled intelligent detection equipment for tea gardens in mountainous and hilly regions. In the existing technical data, the vehicle-mounted platform has poor terrain adaptation in unstructured environments. For example, a system and a method for adjusting the center of gravity of a high-clearance plant protection machine are disclosed in the patent (CN113419553A). The center of gravity of the plant protection machine is adjusted by using adjustable medicine cabinet acks on both sides of the plant protection machine, but the adjustable angle is limited, thus the system is not suitable for mountainous and hilly areas with large slopes and cannot keep a chassis above the machine at a horizontal state. Therefore, sideslip is prone to occurring when the slope of the terrain is large. In addition, a device for obtaining spectral information of field crops is disclosed in the patent (CN111503459B). The device can drive a lead screw to rotate by a motor to achieve the free lifting of a collection platform. However, when the device operates in the terrain with slope, a vehicle body inclines, a platform body cannot be kept at a horizontal state, and the center of gravity of the vehicle body is deviated from the center of the vehicle body. When the slope is large, there is a risk of sideslip or even damaging the vehicle body, which greatly affects the continuity of information collection and operation efficiency:

SUMMARY

An objective of the present disclosure is to provide an unmanned vehicle suitable for mountains and hills and an attitude adjustment method to solve the problems in the prior art and to perform structure innovation and attitude adjustment control strategy study for the achieving of slope adaption in mountainous and hilly areas, which can provide a stable platform for the collection of tea tree information in the mountainous and hilly regions and ensure continuous and stable collection of the tea tree information, is conducive to improving effectiveness and accuracy in information acquisition, and is of a practical guiding significance for the construction of smart tea gardens and the accurate regulation of growth quality of tea leaves.

To achieve the objective above, the present disclosure provides the following solutions:

An unmanned vehicle suitable for mountains and hills is provided. The unmanned vehicle includes a frame, and side arms arranged on both sides of the frame. The lower end of each side arm is provided with a traveling device, and each side arm is provided with an attitude adjustment device. The attitude adjustment devices are respectively connected to both sides of the frame, and are configured to adjust an attitude of the frame. The frame is provided with a control structure and a triaxial angle sensor, both of which are electrically connected to the control structure, and the triaxial angle sensor is configured to detect an angle of inclination of the frame.

Preferably, the attitude adjustment device includes a main sliding structure, an auxiliary sliding structure, an anti-rollover suspension, and a hydraulic pull rod. The hydraulic pull rod is electrically connected to the control structure, the main sliding structure and the auxiliary sliding structure are both arranged on the side arm. One end of the anti-rollover suspension is hinged to the frame, and the other end of the anti-rollover suspension is hinged to the auxiliary sliding structure. One end of the hydraulic pull rod is hinged to the frame, and the other end of the hydraulic pull rod is hinged to the main sliding structure. The frame is hinged to the main sliding structure and the auxiliary sliding structure by connecting structures, respectively.

Preferably, the number of auxiliary sliding structures in each attitude adjustment device is two, and the two auxiliary sliding structures are respectively located on both sides of the main sliding structure.

Preferably, each connecting structure includes a first hinged connecting plate and a second hinged connecting plate. The first hinged connecting plate is hinged to the second hinged connecting plate, the first hinged connecting plate is arranged on the main sliding structure or the auxiliary sliding structure, and the second hinged connecting plate is arranged on the side face of the frame.

Preferably, the main sliding structure includes a stepping motor, a main guide rail slider, a lead screw; and a main guide rail fixing plate. The stepping motor is electrically connected to the control structure, the stepping motor is arranged on the side arm, and the power output end of the stepping motor is connected to one end of the lead screw. The main guide rail slider is threaded to the lead screw; the main guide rail fixing plate is arranged on the main guide rail slider, and the other end of the hydraulic pull rod is hinged to a pull rod hinged plate on the main guide rail fixing plate.

Preferably, the auxiliary sliding structure comprises an auxiliary slide rail, an auxiliary guide rail slider, and a positioning slide rod. The auxiliary slide rail is arranged on the side arm, the positioning slide rod is arranged in the auxiliary slide rail, the auxiliary guide rail slider is sleeved outside the positioning slide rod, and the auxiliary guide rail slider can slide along the auxiliary slide rail. The other end of the anti-rollover suspension is hinged to a suspension hinged plate on the auxiliary guide rail slider.

Preferably, the frame is trapezoidal, and the frame is of a gantry structure.

An attitude adjustment method using the unmanned vehicle suitable for mountains and hills is further disclosed, including the following steps:

after an unmanned vehicle suitable for mountains and hills is started, setting a threshold angle α through a human-computer interaction interface of a control structure: and in the slope-adaptive attitude adjustment process of a frame, after the unmanned vehicle suitable for mountains and hills starts to operate, starting to acquire, by a triaxial angle sensor, an angle of inclination of the frame: if the angle of inclination is greater than the threshold angle α, powering on a solenoid valve of a hydraulic pull rod to enable the hydraulic pull rod to be in an active state: calculating, by an upper computer, a difference value between an actual angle of inclination and the threshold angle α into the number of rotation turns of a stepping motor; converting, by a single-chip microcomputer system of a lower computer, a calculation result into corresponding pulse: controlling the stepping motor by a motor driver, horizontally adjusting the frame until the actual angle of inclination of the frame is less than or equal to a, enabling the stepping motor to stop rotating, powering off and resetting the solenoid valve of the hydraulic pull rod, locking the frame by the hydraulic pull rod, thus completing the slope-adaptive attitude adjustment stage of the unmanned vehicle suitable for mountains and hills: and circulating the control process to achieve real-time dynamic adjustment.

Compared with the prior art, the present disclosure obtains the following technical effects:

The unmanned vehicle suitable for mountainous and hills can operate across a single tea ridge, and can adapt to the topographic slope. Through real-time attitude adjustment, the center of gravity of a vehicle body is always at the center of the vehicle body to ensure that the vehicle body is free of inclination and sideslip and the frame is always kept at a horizontal state, so as to provide a stable platform for the collection of tea tree information in mountainous and hilly regions.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

In the drawings.

Figure 1:
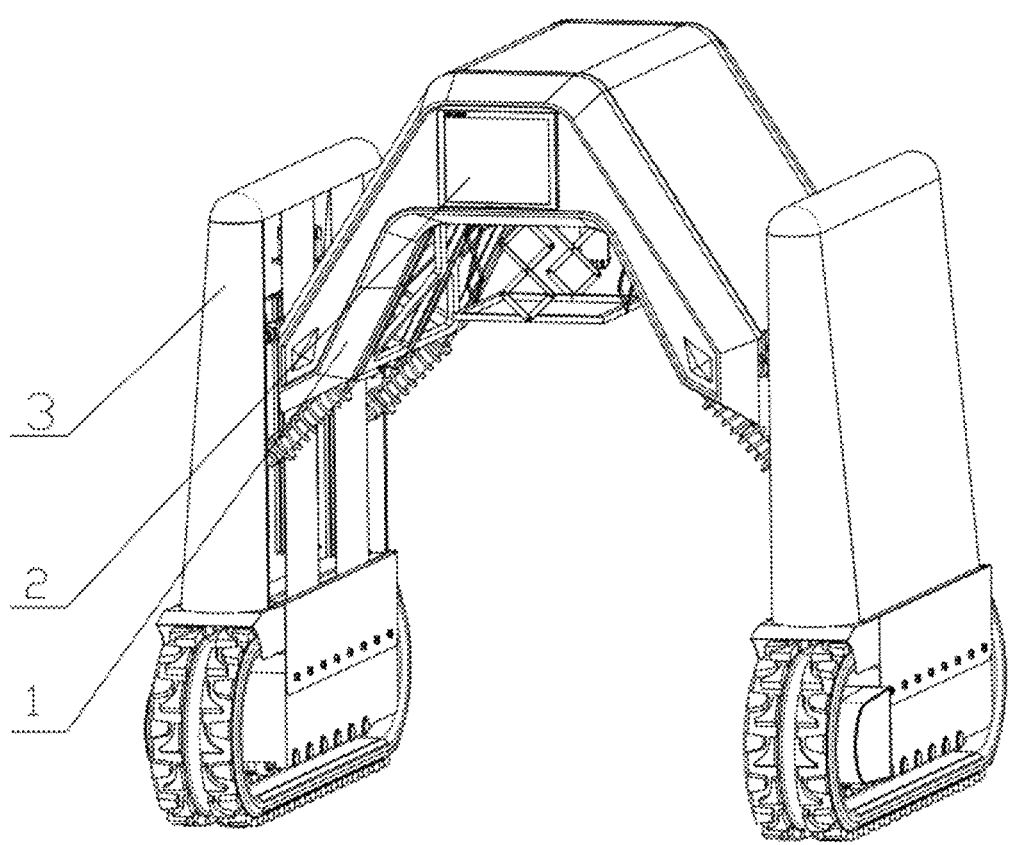
FIG. 1 is an external view of an unmanned vehicle suitable for mountains and hills in accordance with the present disclosure.
Figure 2:
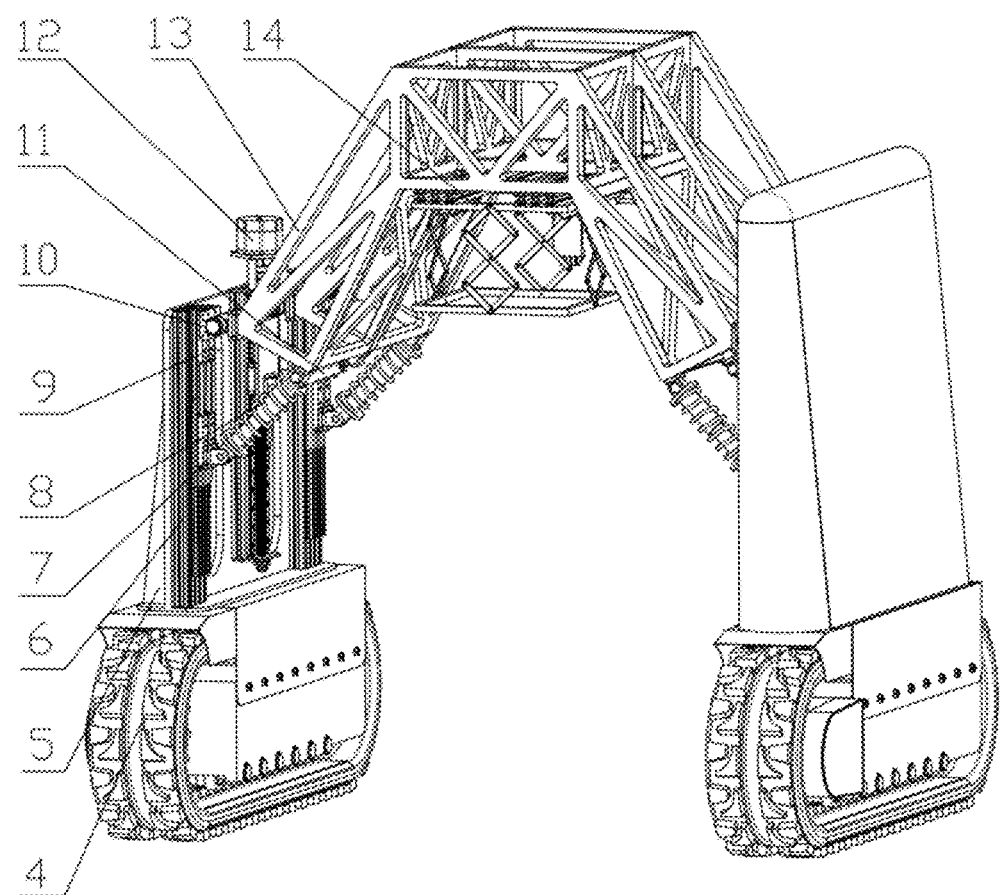
FIG. 2 is an internal structure diagram of an unmanned vehicle suitable for mountains and hills in accordance with the present disclosure.
Figure 3:
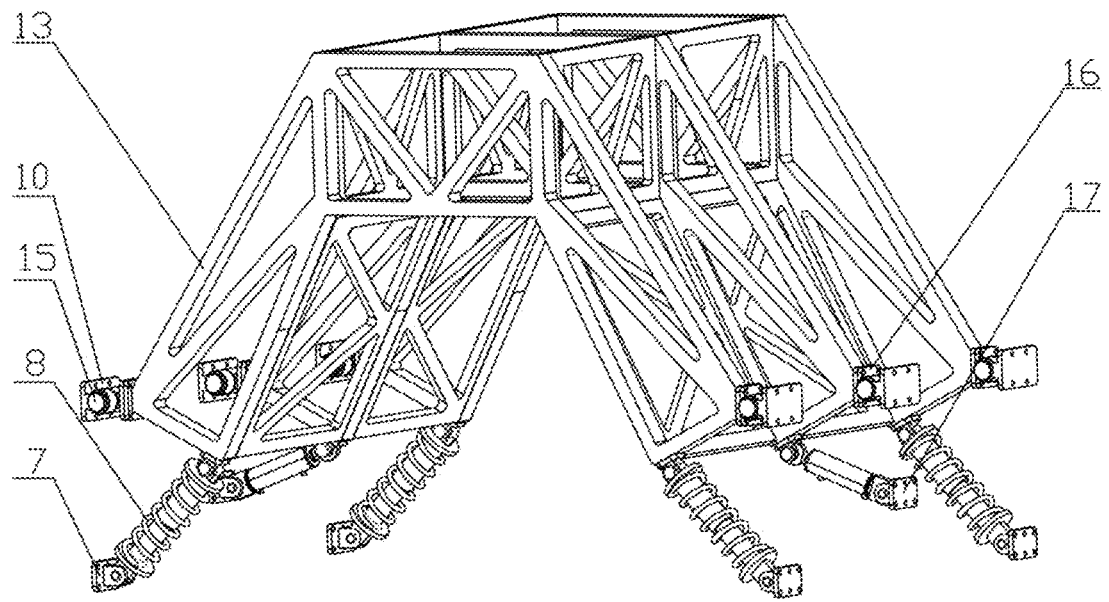
FIG. 3 is a structure diagram of a frame in accordance with the present disclosure.
Figure 4:
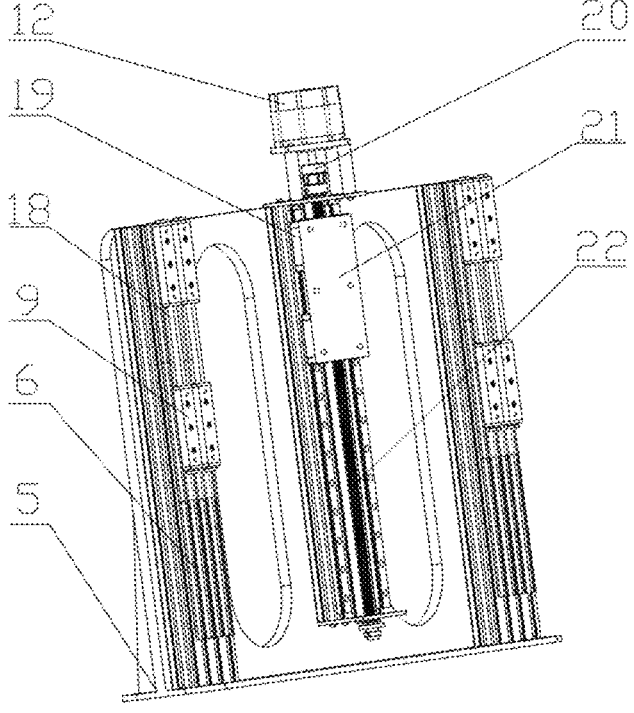
FIG. 4 is a schematic diagram of a main sliding structure and an auxiliary sliding structure in accordance with the present disclosure.
Figure 5:
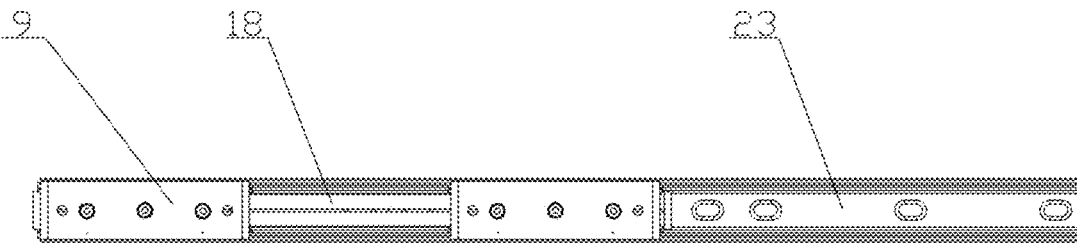
FIG. 5 is a schematic diagram of an auxiliary sliding structure in accordance with the present disclosure.

In the drawings: 1—housing, 2—industrial personal computer: 3—side arm housing, 4—traveling device: 5—side arm supporting plate: 6—auxiliary guide rail fixing plate: 7—suspension hinged plate: 8—anti-rollover suspension: 9—auxiliary guide rail slider: 10—first hinged connecting plate: 11—hydraulic pull rod: 12—stepping motor: 13—frame: 14—information collection module; 15—hinge pin: 16—second hinged connecting plate: 17—pull rod hinged plate: 18—positioning slide rod: 19—main guide rail slider: 20—shaft coupling: 21—main guide rail fixing plate: 22—lead screw; 23—auxiliary slide rail.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an unmanned vehicle suitable for mountains and hills and an attitude adjustment method to solve the problems in the prior art and to perform structure innovation and attitude adjustment control strategy study for the achieving of slope adaption in mountainous and hilly areas, which can provide a stable platform for the collection of tea tree information in the mountainous and hilly regions and ensure continuous and stable collection of the tea tree information, is conducive to improving effectiveness and accuracy in information acquisition, and is of a practical guiding significance for the construction of smart tea gardens and the accurate regulation of growth quality of tea leaves.

To make the objectives, features and advantages of the present disclosure more apparently and understandably, the following further describes the present disclosure in detail with reference to the accompanying drawings and the specific embodiments.

Embodiment 1

As shown in FIG. 1 to FIG. 8, it is provided an unmanned vehicle suitable for mountains and hills in accordance with this embodiment. The unmanned vehicle includes a frame 13, and side arms arranged on both sides of the frame 13. The outside of each side arm is provided with a side arm housing 3, one side of the side arm is provided with a side arm supporting plate 5, the lower end of the side arm is provided with a traveling device 4, and each side arm is provided with an attitude adjustment device. The attitude adjustment devices are respectively connected to both sides of the frame 13. The two attitude adjustment devices are symmetrically arranged on both sides of the frame 13 and are configured to adjust an attitude of the frame 13. The frame 13 is provided with a control structure and a triaxial angle sensor. The control structure includes an industrial personal computer 2 and a single-chip microcomputer, and the industrial personal computer 2 is electrically connected to the single-chip microcomputer. The industrial personal computer 2 is used as an upper computer to acquire and process data, and the single-chip microcomputer is configured to control the action of an actuator. i.e., the triaxial angle sensor is electrically connected to the industrial personal computer 2, the attitude adjustment device is electrically connected to the single-chip microcomputer, and the triaxial angle sensor is configured to detect an of inclination of the frame 13.

Figure 8:
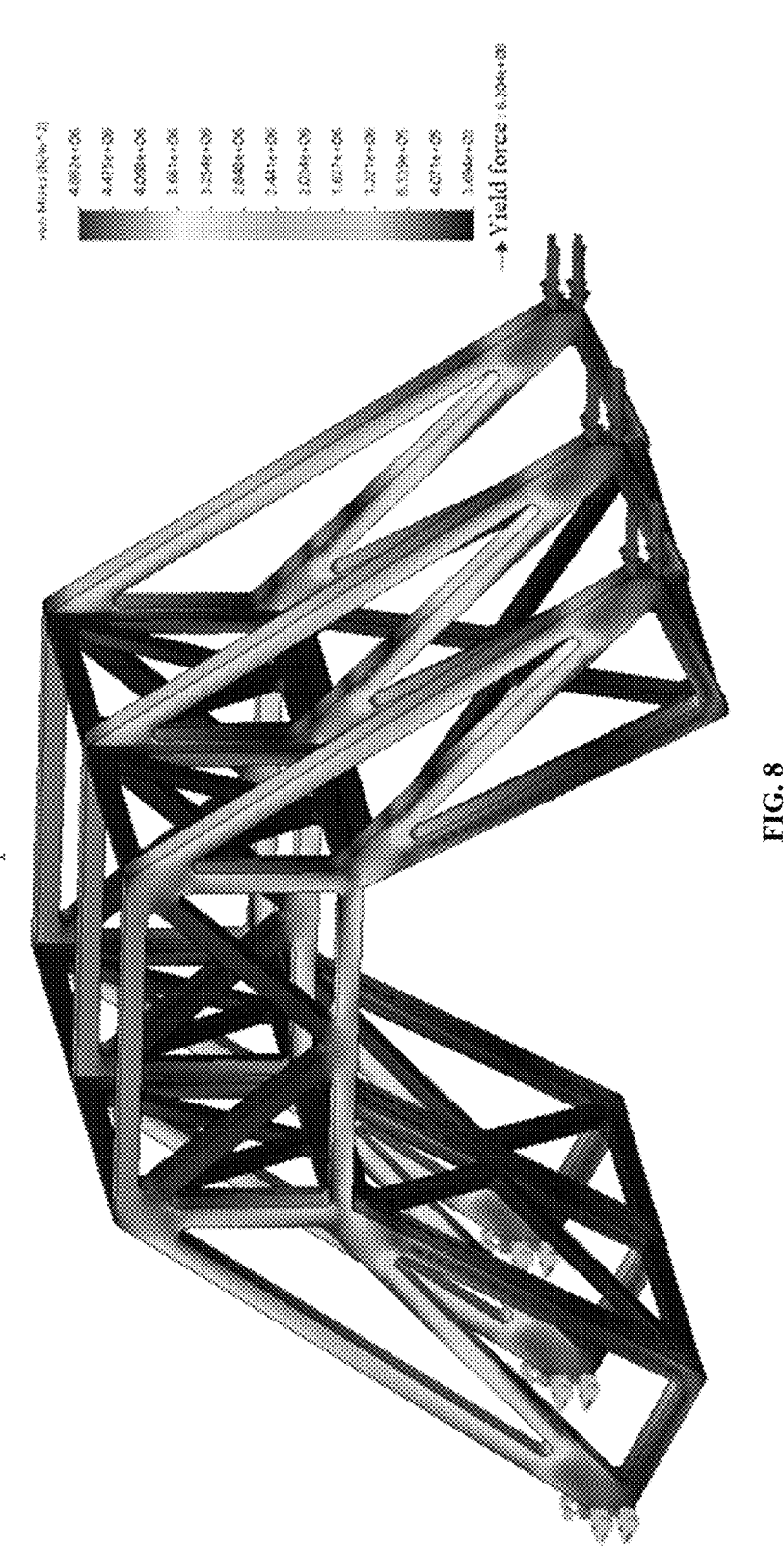
FIG. 8 is a statics simulation analysis diagram of a frame in accordance with the present disclosure.

Specifically, in this embodiment, the frame 13 is trapezoidal, and the frame 13 is of a gantry structure, which can be configured to perform information collection across a single tea ridge. The outside of the frame 13 is provided with a housing 1. The frame 13 can be used as a carrying platform for a sensor module, and also as a support for supporting the whole vehicle. The frame 13 can play a role in supporting the vehicle body well through the structural design of multi-layer gantry: The frame 13 can bear extrusion force from the side arms when the vehicle is in an inclined state, and can bear a torque and perform the transfer of force during the turning of the unmanned vehicle suitable for mountains and hills. A statics analysis result of the frame 13 is as shown in FIG. 8, the frame 13 is made of alloy steel, and a total of 300 kgf is applied to both sides, and the result shows that the maximum stress is much less than yield stress, indicating that the structural design satisfies the actual demand.

In this embodiment, the frame 13 may be provided with an existing information collection module 14. The information collection module 14 is configured to collect canopy information of tea trees, and the information collection module 14 may be equipped with various sensors and equipment such as an active light source, a multi-spectral camera, a RGB camera, and a depth camera.

In this embodiment, each attitude adjustment device includes a main sliding structure, two auxiliary sliding structures, two anti-rollover suspensions 8, and a hydraulic pull rod 11. The two auxiliary sliding structures are respectively located on both sides of the main sliding structure. The hydraulic pull rod 11 is electrically connected to the single-chip microcomputer. The main sliding structure and the auxiliary sliding structures are arranged on the side arm.

Figure 6:
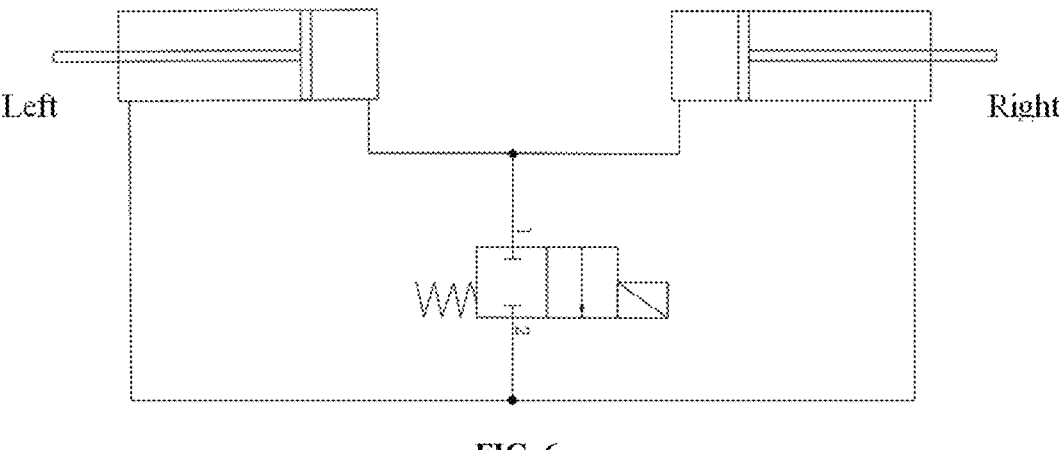
FIG. 6 is a schematic diagram illustrating a connection mode of a hydraulic pull rod in accordance with the present disclosure.
Figure 7:
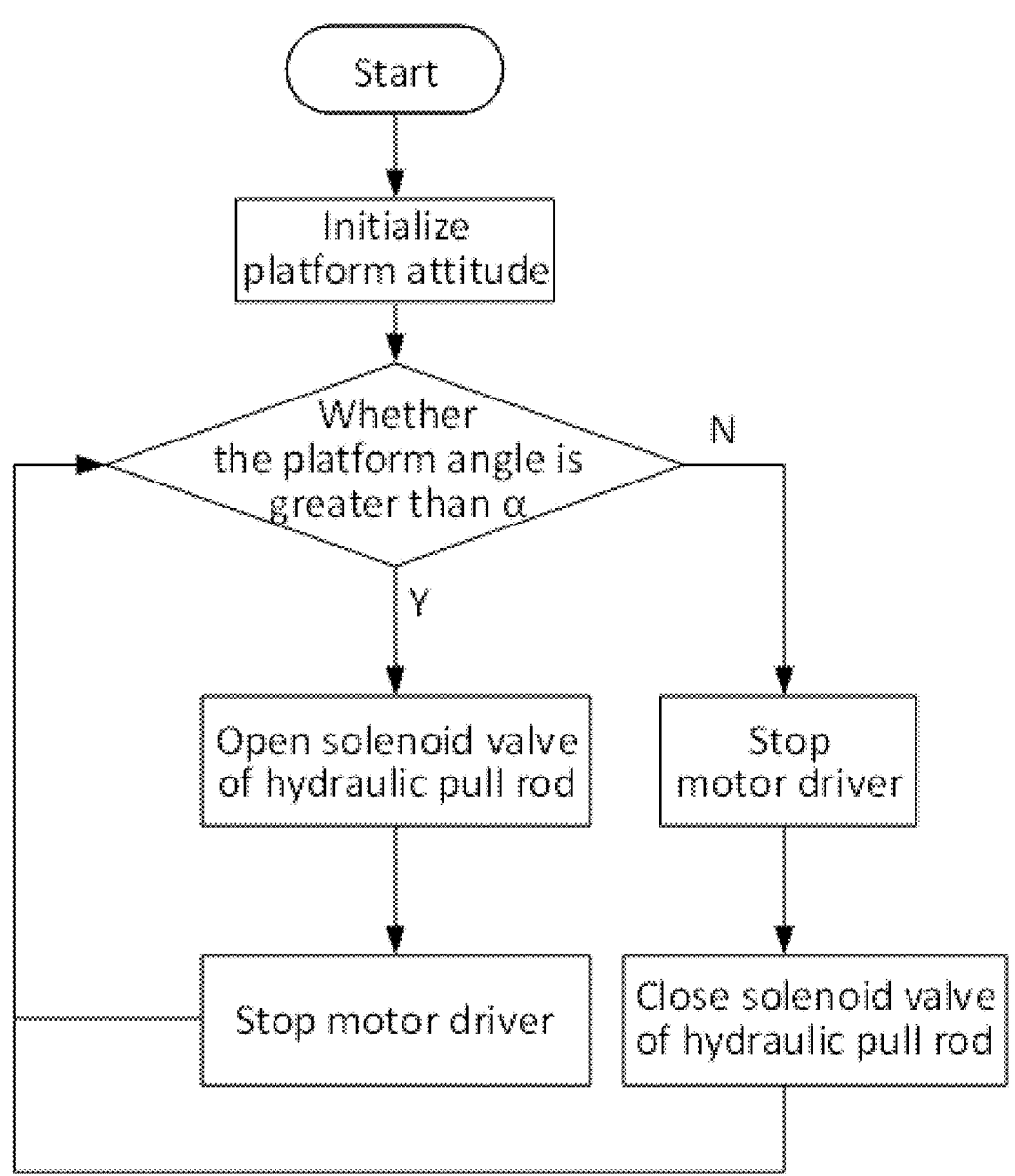
FIG. 7 is a control flow diagram of a hydraulic pull rod in accordance with the present disclosure.

In this embodiment, oil path connection modes of two hydraulic pull rods 11 on both sides of the frame 13 are as shown in FIG. 6. A two-position two-way solenoid valve is used as a solenoid valve of the hydraulic pull rod 11. The hydraulic pull rod 11 may be kept at an active state in the attitude adjustment process of the vehicle body and kept at a locked state after the attitude adjustment of the vehicle body is finished, thus preventing the frame 13 from jittering when the unmanned vehicle suitable for mountains and hills is in the process of traveling, and making the information collection module 14 collect the canopy information of the tea trees more stably, where the control flow diagram is as shown in FIG. 7.

In this embodiment, the two anti-rollover suspensions 8 of each attitude adjustment device are located on the front side and the rear side of the hydraulic pull rod 11, respectively. When the vehicle body inclines, springs of the anti-rollover suspensions 8 are compressed, and the angle of inclination of the frame 13 is limited under the counter-acting force of the anti-rollover suspensions 8, thus avoiding the tip-over of the vehicle body caused by the imbalance of the center of gravity of the vehicle body due to large angle. Under the combined action of the attitude adjustment devices, the center of gravity of the vehicle body is returned to the center, and the frame 13 on the vehicle body is restored to a horizontal state to complete the attitude adjustment.

In this embodiment, the main sliding structure includes a stepping motor 12, a main guide rail slider 19, a lead screw 22, and a main guide rail fixing plate 21. The stepping motor 12 is electrically connected to the single-chip microcomputer, the stepping motor 12 is arranged on the side arm, and the power output end of the stepping motor 12 is connected to one end of the lead screw 22 by a shaft coupling 20. The main guide rail slider 19 is threaded to the lead screw 22, and the main guide rail fixing plate 21 is arranged on the main guide rail slider 19. One end of the hydraulic pull rod 11 is hinged to the bottom of the frame 13, and the other end of the hydraulic pull rod 11 is hinged to a pull rod hinged plate 17 at the lower part of the main guide rail fixing plate 21.

In this embodiment, each auxiliary sliding structure includes two auxiliary slide rails 23, two groups of auxiliary guide rail sliders 9, and positioning slide rods 18. The auxiliary slide rails 23 are arranged on an auxiliary guide rail fixing plate 6 on the side arm. Each auxiliary guide rail slider group 9) includes eight auxiliary guide rail sliders 9, and two positioning slide rods 18 penetrate through the middles of two auxiliary guide rail sliders 9 in each group. The positioning slide rods 18 are arranged in the auxiliary slide rails 23, the auxiliary guide rail sliders 9 can slide along the positioning slide rods 18, and a relative distance between each group of auxiliary guide rail sliders 9 is no longer than the length of the positioning slide rod 18. One end of the anti-rollover suspension 8 is hinged to the bottom of the frame 13, and the other end of the anti-rollover suspension 8 is hinged to a suspension hinged plate 7 on the auxiliary guide rail slider 9.

When the vehicle body inclines suddenly, one end of the frame 13 exerts pressure on the anti-rollover suspension 8, while the other end of the frame 13 exerts tension on the other anti-rollover suspension 8. To guarantee the rapid return of the vehicle body without swaying slightly from left to right, a compression spring is used as the spring in the anti-rollover suspension 8. The providing of the positioning slide rod 18 may guarantee that the lower end of the anti-rollover suspension 8 at the side with the tension can move along the positioning slide rod 18 with the auxiliary guide rail slider 9, thus preventing the anti-rollover suspension 8 from rigid tensile impact caused by the sudden inclination of the vehicle body.

In this embodiment, the frame 13 is hinged to the main sliding structure and the auxiliary sliding structures by connecting structures, respectively. Specifically, each connecting structure includes a first hinged connecting plate 10 and a second hinged connecting plate 16. The first hinged connecting plate 10 is hinged to the second hinged connecting plate 16 by a hinge pin 15, the first hinged connecting plate 10 is arranged at the upper part of the main guide rail fixing plate 21 of the main sliding structure, or the auxiliary guide rail slider 9 of the auxiliary sliding structure, and the second hinged connecting plate 16 is arranged on the side face of the frame 13.

In this embodiment, the traveling device 4 mainly includes a crawler traveling wheel, which can drive the unmanned vehicle to travel and turn, and the bottom plane of the crawler may play a role in stabilizing the vehicle body.

The unmanned vehicle suitable for mountainous and hills provided in accordance with this embodiment can perform information collection across a single tea ridge and can adapt to the topographic slope. Through real-time attitude adjustment, the center of gravity of the vehicle body is always at the center of the vehicle body to ensure that the vehicle body is free of inclination and sideslip and the frame 13 is always kept at a horizontal state, so as to provide a stable platform for the collection of tea tree information in mountainous and hilly regions.

Embodiment 2

Figure 9:
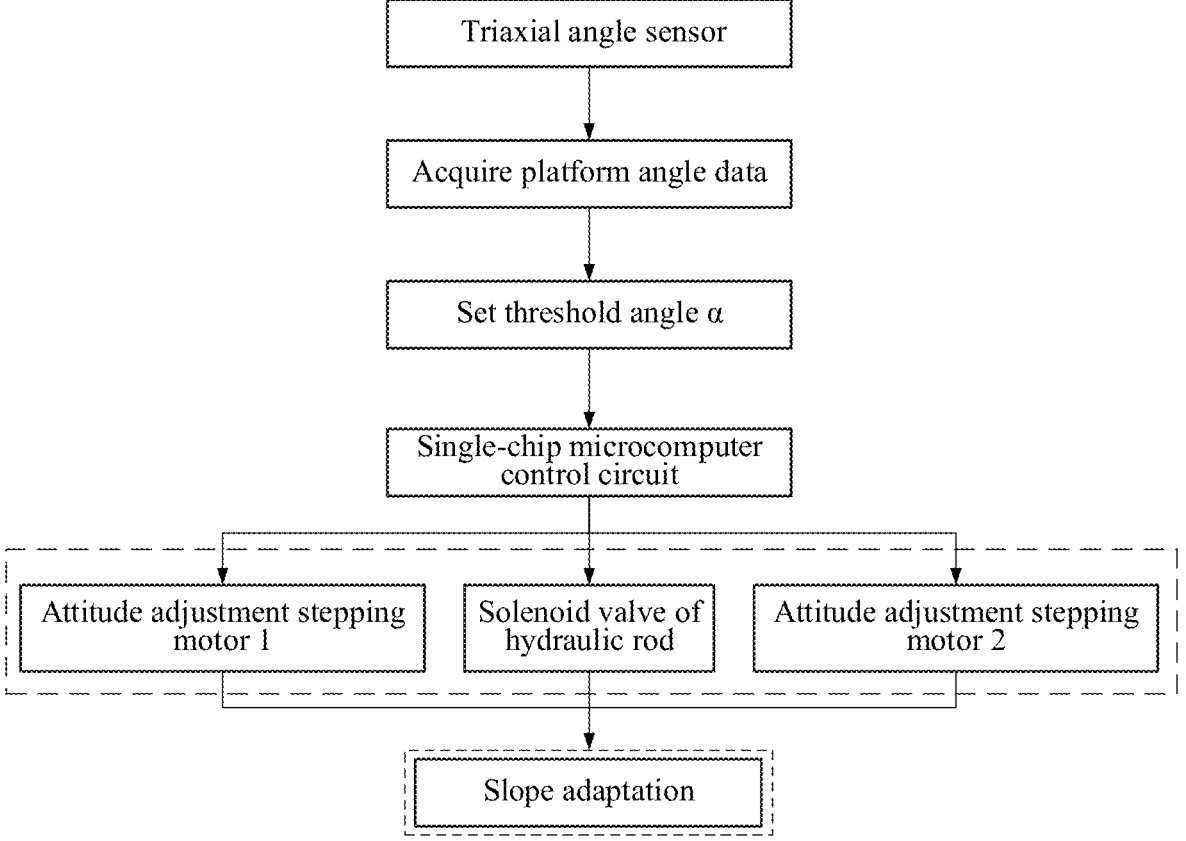
FIG. 9 is a flow diagram of an attitude adjustment method in accordance with the present disclosure.
Figure 10:
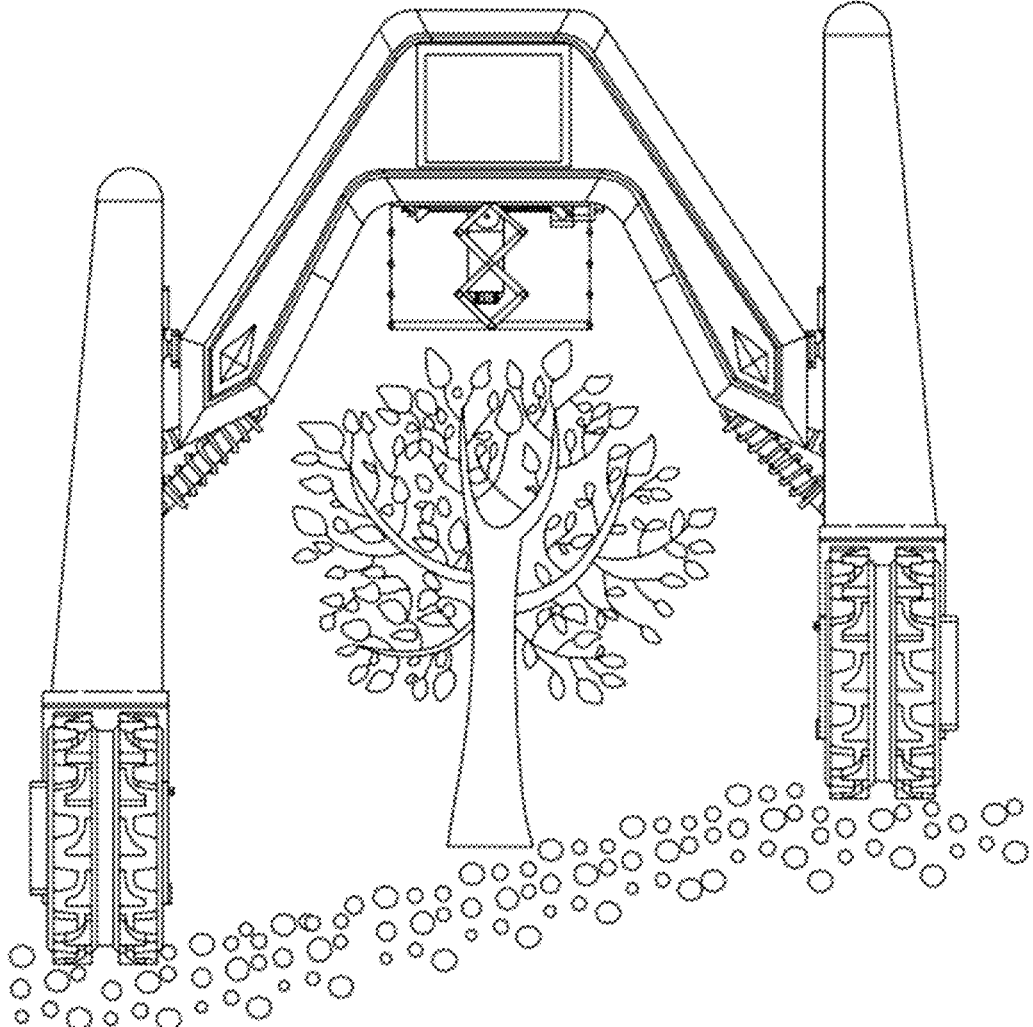
FIG. 10 is a schematic diagram of an unmanned vehicle suitable for mountains and hills in accordance with the present disclosure in an operating state.

As shown in FIG. 9 and FIG. 10, it is provided an attitude adjustment method using the unmanned vehicle suitable for mountains and hills of embodiment 1 in accordance with this embodiment. The method includes the following steps:

After an unmanned vehicle suitable for mountains and hills is started, an upper computer and a lower computer system are started and subjected to program initialization, and a threshold angle $\alpha$ is set through a human-machine interaction interface of an industrial personal computer 2.

In the slope-adaptive attitude adjustment process of a frame 13, after the unmanned vehicle suitable for mountains and hills starts to operate, a triaxial angle sensor starts to acquire an angle of inclination of the frame 13. If the angle of inclination is greater than the threshold angle $\alpha$, a solenoid valve of a hydraulic pull rod 11 is powered on to make the hydraulic pull rod 11 in an active state. The upper computer is configured to calculate a difference value between an actual angle of inclination and the threshold angle $\alpha$ into the number of rotations of a stepping motor 12. A single-ship microcomputer system of a lower computer is configured to convert a calculation result into corresponding pulse. The stepping motor 12 is controlled by a motor driver, the frame 13 is horizontally adjusted until the actual angle of inclination of the frame 13 is less than or equal to a. The stepping motor 12 stops rotating, the solenoid valve of the hydraulic pull rod 11 is powered off and reset, and the frame 13 is locked by the hydraulic pull rod 11, thus completing the slope self-adaptive attitude adjustment stage of the unmanned vehicle suitable for mountains and hills. This control process is circulated to achieve real-time dynamic adjustment.

Several examples are used for illustration of the principles and implementation methods of the present disclosure. The description of the embodiments is merely used to help illustrate the method and its core principles of the present disclosure. In addition, those of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An unmanned vehicle suitable for mountains and hills, comprising a frame and side arms arranged on both sides of the frame, wherein the lower end of each side arm is provided with a traveling device, and each side arm is provided with an attitude adjustment device; the attitude adjustment devices are respectively connected to both sides of the frame, and are configured to adjust an attitude of the frame; the frame is provided with a control structure and a triaxial angle sensor, both of which are electrically connected to the control structure, and the triaxial angle sensor is configured to detect an angle of inclination of the frame, and wherein the attitude adjustment device comprises a main sliding structure, an auxiliary sliding structure, an anti-rollover suspension, and a hydraulic pull rod; the hydraulic pull rod is electrically connected to the control structure, the main sliding structure and the auxiliary sliding structure are both arranged on the side arm; one end of the anti-rollover suspension is hinged to the frame, and the other end of the anti-rollover suspension is hinged to the auxiliary sliding structure; one end of the hydraulic pull rod is hinged to the frame, and the other end of the hydraulic pull rod is hinged to the main sliding structure; and the frame is hinged to the main sliding structure and the auxiliary sliding structure by connecting structures, respectively.

2. The unmanned vehicle suitable for mountains and hills according to claim 1, wherein the number of auxiliary sliding structures in each attitude adjustment device is two, and the two auxiliary sliding structures are respectively located on both sides of the main sliding structure.

3. The unmanned vehicle suitable for mountains and hills according to claim 1, wherein each connecting structure comprises a first hinged connecting plate and a second hinged connecting plate, the first hinged connecting plate is hinged to the second hinged connecting plate, the first hinged connecting plate is arranged on the main sliding structure or the auxiliary sliding structure, and the second hinged connecting plate is arranged on the side face of the frame.

4. The unmanned vehicle suitable for mountains and hills according to claim 1, wherein the main sliding structure comprises a stepping motor, a main guide rail slider, a lead screw, and a main guide rail fixing plate; the stepping motor is electrically connected to the control structure, the stepping motor is arranged on the side arm, and the power output end of the stepping motor is connected to one end of the lead screw; the main guide rail slider is threaded to the lead screw, the main guide rail fixing plate is arranged on the main guide rail slider, and the other end of the hydraulic pull rod is hinged to a pull rod hinged plate on the main guide rail fixing plate.

5. The unmanned vehicle suitable for mountains and hills according to claim 1, wherein the auxiliary sliding structure comprises an auxiliary slide rail, an auxiliary guide rail slider, and a positioning slide rod; the auxiliary slide rail is arranged on the side arm, the positioning slide rod is arranged in the auxiliary slide rail, the auxiliary guide rail slider is sleeved outside the positioning slide rod, the auxiliary guide rail slider is able to slide along the auxiliary slide rail, and the other end of the anti-rollover suspension is hinged to a suspension hinged plate on the auxiliary guide rail slider.

6. The unmanned vehicle suitable for mountains and hills according to claim 1, wherein the frame is trapezoidal, and the frame is of a gantry structure.

7. An attitude adjustment method using an unmanned vehicle suitable for mountains and hills comprising a frame and side arms arranged on both sides of the frame, wherein the lower end of each side arm is provided with a traveling device, and each side arm is provided with an attitude adjustment device; the attitude adjustment devices are respectively connected to both sides of the frame, and are configured to adjust an attitude of the frame; the frame is provided with a control structure and a triaxial angle sensor, both of which are electrically connected to the control structure, and the triaxial angle sensor is configured to detect an angle of inclination of the frame, comprising the following steps:

after the unmanned vehicle suitable for mountains and hills is started, setting a threshold angle α through a human-computer interaction interface of a control structure; and in the slope-adaptive attitude adjustment process of the frame, after the unmanned vehicle suitable for mountains and hills starts to operate, starting to acquire, by the triaxial angle sensor, the angle of inclination of the frame; if the angle of inclination is greater than the threshold angle α, powering on a solenoid valve of a hydraulic pull rod to enable the hydraulic pull rod to be in an active state; calculating, by an upper computer, a difference value between an actual angle of inclination and the threshold angle α into the number of rotation turns of a stepping motor; converting, by a single-chip microcomputer system of a lower computer, a calculation result into corresponding pulse; controlling the stepping motor by a motor driver, horizontally adjusting the frame until the actual angle of inclination of the frame is less than or equal to a, enabling the stepping motor to stop rotating, powering off and resetting the solenoid valve of the hydraulic pull rod, locking the frame by the hydraulic pull rod, thus completing the slope-adaptive attitude adjustment stage of the unmanned vehicle suitable for mountains and hills; and circulating the control process to achieve real-time dynamic adjustment.

8. The attitude adjustment method according to claim 7, wherein the attitude adjustment device comprises a main sliding structure, an auxiliary sliding structure, an anti-rollover suspension, and a hydraulic pull rod; the hydraulic pull rod is electrically connected to the control structure, the main sliding structure and the auxiliary sliding structure are both arranged on the side arm; one end of the anti-rollover suspension is hinged to the frame, and the other end of the anti-rollover suspension is hinged to the auxiliary sliding structure; one end of the hydraulic pull rod is hinged to the frame, and the other end of the hydraulic pull rod is hinged to the main sliding structure; and the frame is hinged to the main sliding structure and the auxiliary sliding structure by connecting structures, respectively.

9. The attitude adjustment method according to claim 8 wherein the number of auxiliary sliding structures in each attitude adjustment device is two, and the two auxiliary sliding structures are respectively located on both sides of the main sliding structure.

10. The attitude adjustment method according to claim 8, wherein each connecting structure comprises a first hinged connecting plate and a second hinged connecting plate, the first hinged connecting plate is hinged to the second hinged connecting plate, the first hinged connecting plate is arranged on the main sliding structure or the auxiliary sliding structure, and the second hinged connecting plate is arranged on the side face of the frame.

11. The attitude adjustment method according to claim 8, wherein the main sliding structure comprises a stepping motor, a main guide rail slider, a lead screw, and a main guide rail fixing plate; the stepping motor is electrically connected to the control structure, the stepping motor is arranged on the side arm, and the power output end of the stepping motor is connected to one end of the lead screw; the main guide rail slider is threaded to the lead screw, the main guide rail fixing plate is arranged on the main guide rail slider, and the other end of the hydraulic pull rod is hinged to a pull rod hinged plate on the main guide rail fixing plate.

12. The attitude adjustment method according to claim 8, wherein the auxiliary sliding structure comprises an auxiliary slide rail, an auxiliary guide rail slider, and a positioning slide rod; the auxiliary slide rail is arranged on the side arm, the positioning slide rod is arranged in the auxiliary slide rail, the auxiliary guide rail slider is sleeved outside the positioning slide rod, the auxiliary guide rail slider is able to slide along the auxiliary slide rail, and the other end of the anti-rollover suspension is hinged to a suspension hinged plate on the auxiliary guide rail slider.

13. The attitude adjustment method according to claim 7, wherein the frame is trapezoidal, and the frame is of a gantry structure.

* * * * *